Jan. 11, 1966  J. F. BLUMRICH  3,228,492
DOUBLE-ACTING SHOCK ABSORBER

Filed March 26, 1964  2 Sheets-Sheet 1

*INVENTORS,*
JOSEF F. BLUMRICH

BY
*ATTORNEYS*

Jan. 11, 1966  J. F. BLUMRICH  3,228,492
DOUBLE-ACTING SHOCK ABSORBER

Filed March 26, 1964  2 Sheets-Sheet 2

*INVENTOR,*
JOSEF F. BLUMRICH

BY
*ATTORNEYS*

United States Patent Office 3,228,492
Patented Jan. 11, 1966

3,228,492
DOUBLE-ACTING SHOCK ABSORBER
Josef Frarer Blumrich, Huntsville, Ala., assignor to the United States of America as represented by the Administrator of the National Aeronautics and Space Administration
Filed Mar. 26, 1964, Ser. No. 355,130
10 Claims. (Cl. 188—1)
(Granted under Title 35, U.S. Code (1952), sec. 266)

The invention described herein may be manufactured and used by or for the Government of the United States of America for governmental purposes without the payment of any royalties thereon or therefor.

This invention relates to a shock absorber which is operable over only a single load cycle. More particularly the invention relates to a device utilizing a crushable energy dissipating material which is especially well adapted for use as a shock absorber in the landing gear system of a vehicle designed to travel to, and land on distant planets or satellities.

The usual shock absorbing device used in the landing gear of aircraft contains a liquid which moves at a controlled rate in response to a mechanical force. By controlling this rate of liquid flow the energy produced by the landing of the aircraft is gradually dissipated. To prevent excessive rebound in response to the landing, a controlled flow of liquid is also used to slow the return of the gear to its normal position after the initial shock has been absorbed.

However, the above described conventional type shock absorbers are totally unsatisfactory where space travel with all its unique problems is involved. It has been found that the use of such shock absorbers present numerous very difficult problems such as, for example, coping with the wide range of temperatures which are encountered in outer space and which may result in failure of the fluid to flow and perform as expected. This characteristic alone constitutes a serious reliability problem. In addition to this reliability problem, existing shock absorbers must be structurally strengthened to resist the high pressures imparted to the fluids by landing shocks. This requirement necessarily results in a device that is relatively heavy, a characteristic which is obviously undesirable. Also, the expense of equipping presently known space vehicles with existing type shock absorbers is excessively high when it is realized that these devices will in all probability be utilized only one time during the life of the vehicle.

Thus it may be seen that a shock absorber for the landing gear system of space vehicles must be rugged, dependable, unaffected by its environment, economical, light, and in certain instances it must be able to absorb a load applied in either of several directions. It can, however, be of the type which operates only once during its life since normally this is all that will be required. It has been found that such a shock absorber can be made which meets all these requirements by replacing the fluid usually used in a shock absorber with a crushable material, such as honeycomb, balsa wood, or foamed material that is disposed between two moveable plates and on both sides of a moveable load application plate. This assembly is mounted within a container in such a manner that when a load is applied in one direction, part of the energy absorbing material is crushed between the load application plate and one of the moveable plates. If, after the initial energy has been dissipated, a force is applied in the opposite direction the heretofore unloaded portion of the material is crushed between the other moveable plate and the load application plate. This is made possible by moving the inactive moveable plate with the force application plate and securing it in place by means of a locking ring after the initial shock is dissipated.

Accordingly it is an object of this invention to provide a shock absorber which is light in weight, rugged, dependable, and unaffected by its environment.

It is another object of this invention to provide a shock absorber that is inexpensive to produce and is especially well suited for a one cycle use as on space vehicles.

A still further object of this invention is to provide a shock absorber which is capable of withstanding forces applied in various directions.

These and other objects and advantages of this invention will be more apparent upon reference to the following specification, appended claims and drawing wherein:

In order to better understand the construction and use of this novel shock absorbing device, it will be described in relation to a landing gear system for a space vehicle. It is to be understood, however, that various other uses may be found for this device. For example such a shock absorber could be used to dissipate sudden and unusual impacts on automobile bumpers. Car stoppers at the end of railway spur lines could be equipped with a shock absorber of this type and it could also be used in conjunction with a fluid shock absorber to dissipate impacts greater than those for which the primary device is designed. Other uses will be readily apparent to those skilled in the art.

Figure 1:
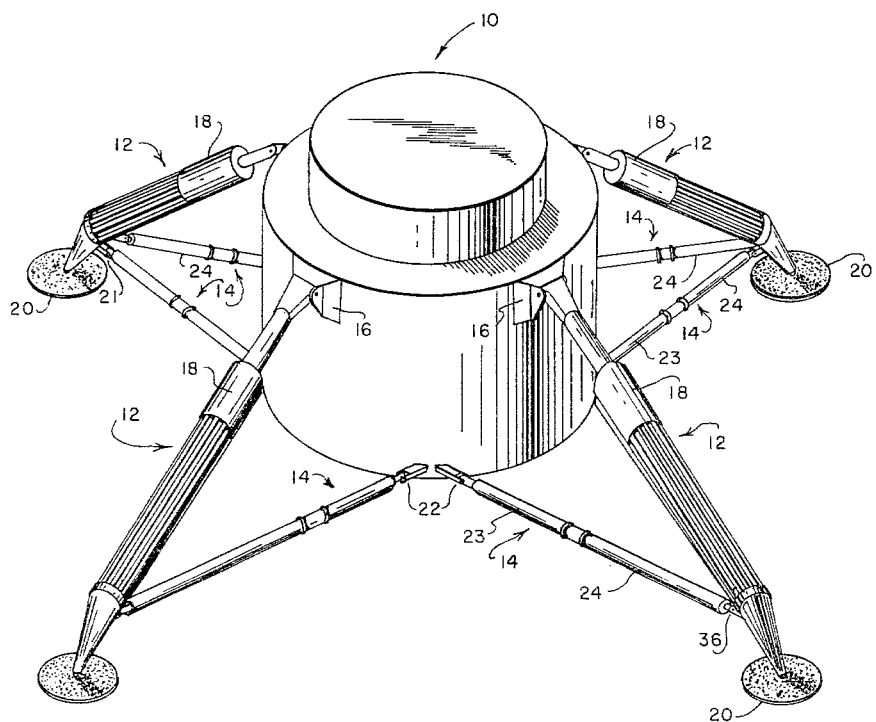
FIGURE 1 is a pictorial view of a space vehicle equipped with a landing gear system including shock absorbers of the type which is the subject of this invention.

With continued reference to the accompanying figures wherein like numerals designate similar parts throughout the various views and with initial attention directed to FIGURE 1, reference numeral 10 designates a space vehicle designed to land on distant planets or satellites. In order to cushion the landings of such a space vehicle upon a celestial body, a landing gear system consisting of a plurality of main struts 12 and bracing struts 14 is utilized. The main struts 12 are universally pivotally secured to the space vehicle 10 by couplings 16 and include a hollow tube having associated therewith a shock absorbing portion 18. Universally pivotally secured to the outer ends of struts 12 are dish shaped landing feet 20 that are adapted to engage a large portion of the landing surface and thus provide a solid base for supporting the vehicle 10. The bracing struts 14 are secured at one end to the lower end of the main struts by universal couplings 21 and to the space vehicle 10 by universal couplings 22. Each bracing strut 14 comprises a first tube 23 telescopically related to a second tube 24 enclosing a shock absorbing device.

The couplings 16, 22, and 23 are necessary to permit the main and bracing struts to be folded downwardly to reduce aerodynamic drag during atmospheric flight or to allow the entire vehicle to be stored within a rocket vehicle nose cone. Upon command, prior to landing, these braces are extended outwardly and locked in the position as shown in FIGURE 1.

The main struts 12 of the landing gear system are subjected to landing forces acting in a plane which is perpendicular to the surface upon which the vehicle 10 is alighting. If, however, the vehicle is not correctly oriented with respect to the landing surface or if the surface is uneven, forces tending to push the main struts sideways are produced upon impact. Likewise, if the vehicle lands on an inclined surface and begins to slide, the main struts 12 will be pushed to one side or the other as obstructions on this surface are encountered. Thus, while the shock absorbing portion 18 of the main strut need be adapted to absorb energy exerted in only one direction, the shock absorber enclosed in the bracing strut must be capable of acting in two directions since it is impossible to predict on which side landing forces will first be exerted. A double acting type shock absorber which is especially adapted for use on such a space vehicle will be described hereinafter but it is obvious that they may also be used merely as single action absorbers if such is desirable or necessary.

Figure 2:
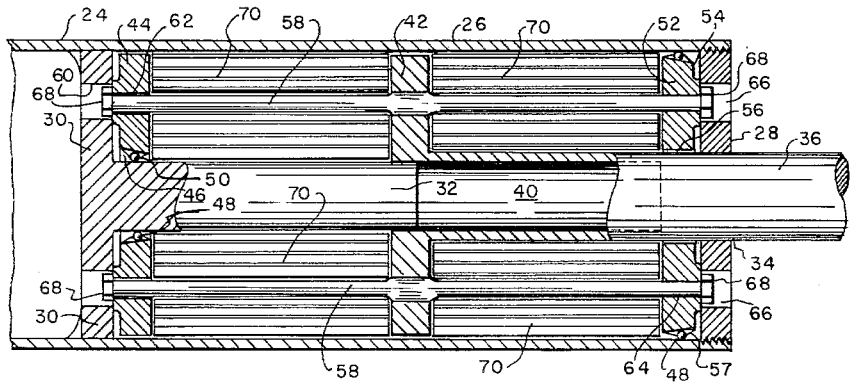
FIGURE 2 is an enlarged, longitudinal, partly sectional view showing a shock absorber constructed in accordance with one form of the invention.

Referring first to the embodiment illustrated in FIGURE 2, the shock absorber is enclosed within an end 26 of the tube 24 between an outer end cap 28 and an inner end cap 30. The outer end cap 28 is removably threaded or otherwise suitably secured in an open end of the tube 24 while the inner end cap 30 is welded or otherwise suitably secured interiorly to the tube. The inner cap 30 includes an integral guide portion 32 extending into the space defined by the walls of the tube and the two end caps. The outer end cap 28 is apertured at 34 to receive a rod 36 which, as best shown in FIGURE 1, is secured to the hinge 21. This rod 36 also extends into the interior of the shock absorber and is hollowed out to provide a partly enclosed space 40. A pressure plate 42 is also formed on or secured to the inner end of the rod 36 by any suitable method. This plate 42 is of such a size as to substantially block the interior of the tube 24 and yet is slidable in relation thereto. A first movable plate 44 is mounted in juxtaposed relationship to the inner end cap 30 and is, like the pressure plate 42 of such a size as to substantially block the interior of the tube 24 and yet remain slidable relative thereto. A tapered aperture 46 extends through the first plate 44 to receive the guide 32. Sufficient clearance is provided between the face of the aperture 46 and the guide 32 so as to allow a space for a locking ring composed of a plurality of balls 48 secured to the aperture face by a retainer ring 50.

The second movable plate 52, which is also of such a size as to substantially block the interior of the casing 24 and yet remain slidable relative thereto, is positioned next to the outer end plate 28. The outer peripheral face 54 of this second plate is tapered similarly to the aperture 46 and, again, sufficient clearance is provided between the tube 24 and the plate face 54 to allow insertion of a locking ring composed of balls 48 secured to the tapered face by a retaining ring 57. The rod 36 is slidable through an aperture 56 in this second plate.

A plurality of elongated rods 58 is securely attached to the pressure plate 42 in any suitable manner as, for example, by shrink fitting, welding, or threading. These rods are slidable through apertures 60, 62, 64, and 66 in the inner cap, first plate, second plate, and outer cap, respectively. Heads 68 are fabricated on the ends of the rods 58 most remote from the pressure plate 42 and are of such a size that they may pass through apertures 60 and 66 but not through apertures 62 and 64.

Filling the interior of the tube 24 between the inner and outer caps, is a shock absorbing material 70 which is illustrated as aluminum honeycomb. Any crushable material, however, may be used as long as it is not affected by environmental conditions or some inherent adverse property peculiar to the material itself. Examples of such materials that may be used include balsa wood, foamed plastic, or a crushable granular material.

When the space vehicle 10 lands on the surface of a planet or satellite, the shock absorbing device illustrated in FIGURE 2 efficiently dissipates the energy created by the impact in substantially the following manner. As the force applied to the rod 36, in a direction running from the outer cap 28 to the inner cap 30, urges the pressure plate 42 toward the first movable plate 44 which is retained in position by locking balls 48 and/or inner end cap 30, the guide 32 slides into the hollowed out space 40 and the rods 58 slide through apertures 60 and 62. Nothing, therefore, impedes the movement of plate 42 toward the plate 44 except the material 70. Since this material is readily crushed the energy applied to plate 42 is gradually dissipated.

In moving toward the movable plate 44, the pressure plate 42 carries rods 58 with it. Since the heads 68 will not pass through the aperture 64 in the second movable plate 52, this plate is moved also. The material 70 between the pressure plate 42 and the movable plate 52 is not crushed, however, since the head 68 and pressure plate 42 remain spaced at a constant distance. When the plates 42 and 52 have been moved as far toward the movable plate 44 as is necessary to dissipate the landing shock, the second plate 52 is held in its displaced position by its locking ring since any movement toward the outer cap 28 tends to force the ball 48 up the taper 54 and into tight engagement with the wall of tube portion 24. Thus, if a second landing shock occurs in a direction which forces the pressure plate 42 toward movable plate 52, the rods 58 will pass through apertures 64 and 66, and the material 70 between these plates will be crushed.

It is obvious that if the sequence of application of forces should be reversed, the material between the pressure plate 42 and the second plate 52 will be crushed first and the first end plate 44 will be carried along with pressure plate 42. When the impact energy exerted in that direction has been dissipated, the first movable plate 44 will be locked in position by the interaction between the balls 48, the guide 32, and the tapered aperture 46. Thus, shock occurring initially in either of two directions may be dissipated.

If after a landing has occurred it is deemed desirable to reuse the device illustrated in FIGURE 2, all that need be done is to remove the outer end cap 28 whereupon elements 36, 42, 44, and 52 may be removed and the crushed material 70 replaced by an uncrushed piece of material inserted between plates 44, 42, and 52. The assembly is then returned to the tube and outer cap 28 replaced. At this time the shock absorber is again ready to be used.

Figure 3:
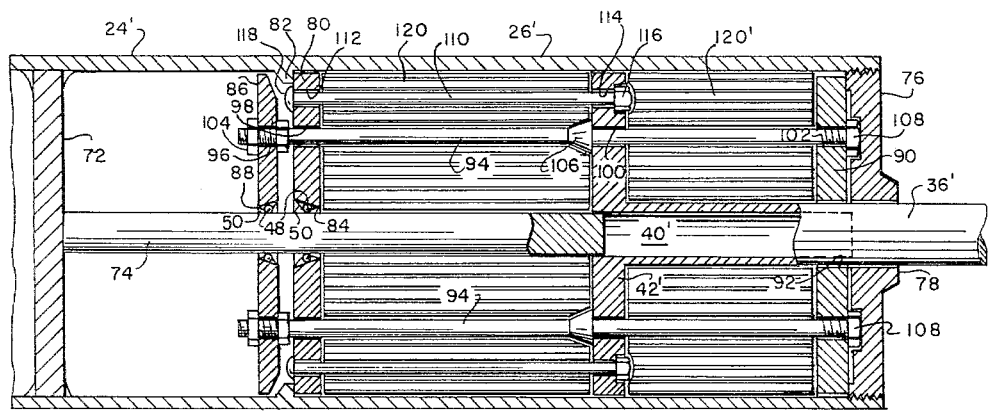
FIGURE 3 is a view similar to FIGURE 2 showing a shock absorber constructed in accordance with another form of the invention.

Under some circumstances, such as where very heavy loads are to be absorbed, it is deemed desirable to have the locking force which is exerted by balls 48 always applied against a solid element such as guide 32, instead of against the relatively thin wall of the tube 24. While this force is applied against guide 32 by the balls secured to plate 44 in the embodiment illustrated in FIGURE 2, it is not possible to lock the plate 52 against the rod 36 since this would defeat the double action feature of the invention. In the embodiment illustrated in FIGURE 3, however, the locking force is always applied against a solid element. In this embodiment, an inner end cap 72 is welded or otherwise suitably fixed within the tube 24' and includes an integral guide piece 74 extending into the interior of the end portion 26'. An outer end cap 76 is threaded into the tube 24' and a rod 36' is slidably mounted in an aperture 78 in the cap 76 and extends into the interior of the tube. A pressure plate 42' is secured to the inner end of the rod 36' which also includes a hollowed out space 40'.

A first movable end plate 80 is mounted within the tube 24' in juxtaposition to a tube lip 82 and includes a tapered aperture 84 receiving the guide rod 74. As in the embodiment illustrated in FIGURE 2, a locking ring, which includes a plurality of balls 48 secured in place by retainer rings 50, is mounted in the tapered aperture 84. A locking plate 86 is positioned in the tube 24' on the side of the lip 82 remote from the first plate 80. The locking plate also includes a tapered aperture 88 in which a locking ring composed of a plurality of balls 48 and ball retainer means 50 is mounted. This aperture 88 like aperture 84 also receives the guide rod 74 but is tapered in a direction opposed to the taper direction of the aperture 84 in the first plate 80.

A second movable plate 90, including an aperture 92 through which the rod 36′ is free to slide, is positioned within the tube 24′ next to the outer end plate 76. Unlike the other movable plates, this second plate contains no tapered aperture nor is there any locking ring means connected thereto. This plate as well as plates 80 and 86 are of such a size as to substantially block the interior of the tube 24′ but all remain slidable relative thereto.

A first set of rods 94 extends through apertures 96, 98, 100, and 102 in the locking plate 86, first movable plate 80, pressure plate 42′, and second movable plate 90, respectively. These rods are secured to the locking plate 86 by a pair of lock nuts 104 threaded thereto but are slidable in apertures 98, 100, and 102. When the pressure plate 42′ is moved toward the inner end cap 72, it will bear against a flange 106 on the rods 94 and hence push those rods in that direction. In this instance lock nuts 108 on the rods 94 will cause the second movable plate 90 to move with the pressure plate 42′.

A second set of rods 110 is slidable in apertures 112 and 114 in the first movable plate 80 and the pressure plate 42′, respectively. When the pressure plate 42′ moves toward the outer end cap 76, it bears against lock nut 116 and thereby carries the rods 110, the rod head 118, and the first movable plate 80 with it.

When a force is directed on rod 36′ tending to move it from the outer end cap 76 toward the inner end cap 72, the pressure plate moves and crushes the material 120 between it and the first movable plate 80. The latter plate is constrained from movement in this direction by tube lip 82 and/or locking balls 48. While this movement is occurring the pressure plate 42′ is sliding relative to the second pair of rods 110 but, because of flange 106, is carrying the first pair of rods 94 along with it. Since the locking plate 86 is secured to the rods 94 it also moves toward the inner end cap 72. The second movable plate 90 is carried spacedly from the pressure plate 42′ with the first pair of rods 94 because of the action of lock nut 108. After the pressure plate 42′ has traveled far enough to dissipate the impact energy, the locking plate 86 is prevented from traveling in the reverse direction by the interaction of ball 48 and guide rod 74. Thus, because of the first pair of rods 94 and the lock nuts 108, the second movable plate 90 is also held in the displaced position. Then if a shock occurs which tends to move the pressure plate 42′ toward the outer end cap 76, it will be dissipated in crushing the material disposed between the force plate and the second movable plate 90.

If the first landing shock occurs in a direction which tends to first urge the pressure plate 42′ toward the outer end cap 76, the material 120′ between it and the third movable plate 90 will be crushed initially. As this occurs the first movable plate 80 is drawn toward the outer end cap 76 by the action of the pair of rods 110 and heads 118. Obviously the distance between the pressure plate 42′ and the first movable plate 80 remains constant and, therefore, the material 120 therebetween is not crushed. When the pressure plate 42′ has moved toward the outer end cap 76 a distance sufficient to dissipate the initial landing shock, the first movable plate 80 will be prevented from traveling in a reverse direction by the interaction of balls 48 and the guide 74. Then, if a second landing shock occurs which tends to move the pressure plate 42′ toward the inner end cap 72, the material between it and the first movable plate 80 will be crushed, thereby dissipating energy produced.

If it should be deemed desirable to replace the materials 120 after crushing has taken place, such is easily accomplished by removing the outer end cap 76, the second movable plate 90, the pressure plate 42′ and rod 36′. Either of plates 80 or 86, which have been moved during the landing, may also be freed during this operation and returned to their original positions.

While the shock absorbing device has been described generally in terms of a cylindrical casing and annular plate members, it is obvious that other suitable shapes may also be used. The basic operation of this device will not be changed if square, triangular, hexagonal, or other forms are used. The various components may also be constructed of any suitable material which has the attributes of being light as well as strong. Furthermore, while as illustrated, lock nuts have been utilized in various places in the devices illustrated in FIGURES 2 and 3, any other suitable removable fastening means would be satisfactory.

The shock absorbing crushable material disposed between the various plates may also be formed in a manner well known in the art to produce a variable energy dissipation rate. For example, if it is deemed desirable to gradually increase the energy dissipation rate, the material may be formed as a cone the apex of which is closest to the pressure plate 42 or 42′. Other forms will be obvious to those familiar with the art.

While the outer end cap is described as being threaded into the tube portion, it is obvious that other suitable securing methods may be utilized such as mating flanges on the tube and end cap secured together with clips or bolts. Likewise it is obvious that instead of locking balls 48 other shapes such as wedges or serrated elements may be used.

It will be apparent that by utilizing the teachings of this disclosure, a shock absorbing device which is rugged, economical, simple, and which is not affected by environment can be produced. This device has the further advantages, as compared to a shock absorber using a fluid, of being more reliable, lighter in weight and easier to fabricate. It is obvious that this device is ideally suited to missions requiring the landing of a payload on a distant planet or satellite.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A shock absorber comprising:
    (a) a container having opposed end portions;
    (b) a first plate disposed in one end portion of said container;
    (c) a second plate disposed in the other end portion of said container;
    (d) a pressure plate movably disposed within said container between said first and second plates with a solid portion of said pressure plate extending between a solid portion of each of said first and second plates;
    (e) means for applying a moving force to said pressure plate;
    (f) crushable material disposed in said container between said solid portions of each of said plates whereby forces tending to move said pressure plate toward either of said first or second plates will be dissipated.

2. A shock absorber comprising:
    (a) a container having opposed end portions;
    (b) a movable pressure plate disposed in said container;
    (c) a first plate disposed in said container between said pressure plate and one of said opposed end portions;
    (d) a second plate disposed in said container between said pressure plate and the other of said opposed end portions;
    (e) said pressure plate being movable toward either of said first or second plates;
    (f) means for applying a moving force to said pressure plate; and (g) crushable means removably placed between said pressure plate and said first and second plates for resisting movement of said pressure plate whereby any force applied to said pressure plate will be gradually dissipated.

3. A shock absorber adapted to be used in the landing gear system of space vehicles designed to land on distant planets or satellites comprising:
   (a) a container having opposed end portions;
   (b) a movable pressure plate disposed in said container between said opposed end portions;
   (c) a first movable plate disposed in said container in one of said end portions;
   (d) a second movable plate disposed in said container in the other of said end portions;
   (e) means cooperatively associated with said first movable plate for securing said plate against movement away from said pressure plate;
   (f) means cooperatively associated with said second movable plate for securing said plate against movement away from said pressure plate;
   (g) means on said pressure plate cooperating with said first movable plate for urging said movable plate away from said one end portion when said pressure plate is moved in that direction;
   (h) said means on said pressure plate also cooperating with said second movable plate for urging said movable plate away from said other end portion when said pressure plate is moved in that direction;
   (i) crushable material disposed between said pressure plate and said movable plates to impede movement of said pressure plate toward said movable plates; and
   (j) means for applying forces on said pressure plate whereby said plate is moved toward a movable plate carrying the other movable plate therewith to a first position whereupon said other plate is secured in place by said means cooperatively associated therewith ready, with said crushable material to resist a force which moves said pressure plate toward it.

4. A shock absorber adapted to be used in the landing gear system of space vehicles designed to land on distant planets or satellites comprising:
   (a) a container having opposed end portions;
   (b) a first retaining means in one of said end portions;
   (c) a second retaining means in the other of said end portions;
   (d) a movable pressure plate disposed in said container between said retaining means;
   (e) a first movable plate disposed in said container between said first retaining means and said pressure plate;
   (f) a second movable plate disposed in said container between said second retaining means and said pressure plate;
   (g) means cooperatively associated with said first movable plate for securing said plate against movement toward said first retaining means;
   (h) means cooperatively associated with said second movable plate for securing said plate against movement toward said second retaining means;
   (i) means on said pressure plate cooperating with said first movable plate for urging said movable plate away from said first retaining means when said pressure plate is moved in that direction;
   (j) said means on said pressure plate also cooperating with said second movable plate for urging said movable plate away from said second retaining means when said pressure plate is moved in that direction;
   (k) crushable material disposed between said pressure plate and said movable plates to thereby impede movement of said pressure plate toward said movable plates; and
   (l) means for applying moving forces on said pressure plate whereby said plate is moved toward a movable plate carrying the other movable plate therewith to a first position whereupon said other plate is secured in place by said means cooperatively associated therewith, ready, with said cushable material, to resist a force which moves said pressure plate toward it.

5. A shock absorber according to claim 4 wherein said means on said pressure plate cooperating with said first and second plates comprises:
   (a) an elongated rod secured to said pressure plate and slidably extending through an aperture in each of said movable plates; and
   (b) said rod including a portion of each of its ends at the point most remote from said pressure plate having a transverse extent greater than the transverse extent of said aperture.

6. A shock absorber according to claim 5 wherein a plurality of said elongated rods is utilized.

7. A shock absorber according to claim 4 wherein:
   (a) said means cooperatively associated with said first movable plate comprises:
      (1) a tapered surface on the outer periphery of said plate opening toward said first retaining means and spacedly facing the inner surface of the wall of said container;
      (2) a locking ball disposed on said tapered surface and having a diameter which is less than the maximum but greater than the minimum distance between said surface and said inner surface of said container wall;
      (3) ball retaining means on said tapered surface for holding said ball within a limited range of movement whereby said ball will roll freely when said plate is moved from said retaining means but will become wedged between said tapered surface and said wall when moved toward said retaining means; and
   (b) said means cooperatively associated with said second movable plate comprises:
      (1) an elongated solid rod secured to said second retaining means and extending through an aperture in said second movable plate;
      (2) a tapered surface on the periphery of said aperture opening toward said first retaining means and spacedly facing the outer surface of said rod;
      (3) a locking ball disposed on said tapered surface having a diameter which is less than the maximum but greater than the minimum distance between said surface and said outer rod surface;
      (4) ball retaining means on said tapered surface for holding said ball within a limited range of movement whereby said ball will roll freely when said plate is moved from said retaining means but will become wedged between said tapered surface and said wall when moved toward said retaining means.

8. A shock absorber according to claim 4 wherein said means on said pressure plate cooperating with said first and second plates comprises:
   (a) a first elongated rod slidably extending through apertures in said first and second movable plates and said pressure plate and including:
      (1) a first protuberance contiguous to the side of said pressure plate most remote from said first movable plate having a transverse extent greater than the transverse extent of said pressure plate aperture, and
      (2) a second protuberance contiguous to said first movable plate on the side most remote from said pressure plate having a transverse extent greater than the transverse extent of said first movable plate aperture whereby said movable plate will be moved when said pressure plate is forced away from said first retaining means;
(b) a second elongated rod slidable through apertures in said pressure plate and said second movable plate and including protuberances contiguous to the sides of said pressure plate and said second movable plate most remote from one another, each protuberance having a transverse extent greater than the transverse extent of said apertures whereby when said pressure plate is urged away from said second retaining means said second movable plate is carried with it.

9. A shock absorber according to claim 8 wherein a plurality of said first and second rods is utilized.

10. A shock absorber according to claim 4 wherein:
(a) an elongated solid rod secured in said other container end portion extends toward said pressure plate through an aperture in said second movable plate;
(b) said means cooperatively associated with said first movable plate comprises:
   (1) an elongated rod slidably extending through apertures in said first and second movable plates and said pressure plate and including protuberances contiguous to the sides of said pressure and first movable plates most remote from one another, each protuberance having a transverse extent greater than the transverse extent of its associated aperture;
   (2) a locking plate secured to the end of said rod which is most remote from said first movable plate;
   (3) an aperture in said locking plate receiving said solid rod;
   (4) said aperture having a tapered surface opening toward said pressure plate and spacedly facing the outer surface of said solid rod;
   (5) locking ball means disposed on said tapered surface and having a diameter which is less than the maximum but greater than the minimum distance between said tapered surface and said solid rod outer surface;
   (6) locking ball retaining means on said tapered surface for holding said ball means within a limited range of movement whereby said ball will roll freely when said first movable plate and said locking plate are moved away from said first retaining means but will become wedged between said tapered surface and said wall when moved toward said retaining means; and
(c) said means cooperative associated with said second movable plate comprises:
   (1) an aperture in said second movable plate receiving said solid rod;
   (2) said aperture being bounded by a tapered surface opening away from said pressure plate and spacedly facing the outer surface of said solid rod;
   (3) a locking ball disposed on said tapered surface and having a diameter which is less than the maximum but greater than the minimum distance between said tapered surface and said solid rod outer surface, and;
   (4) ball retaining means on said tapered surface for holding said locking ball means within a limited range of movement whereby said ball will roll freely when said second movable plate is moved away from said second retaining means but will become wedged between said tapered surface and said wall when moved toward said retaining means.

References Cited by the Examiner
UNITED STATES PATENTS 2,401,748 6/1946 Dillon.
3,190,592 6/1965 Grizzle _____ 267—1

MILTON BUCHLER, *Primary Examiner.*
DUANE A. REGER, *Examiner.*